Patented July 31, 1951

2,562,218

UNITED STATES PATENT OFFICE 2,562,218

PRODUCTION OF ETHER ESTERS

Malcolm Kent Smith, Elizabeth, N. J., assignor to The Baker Castor Oil Company, Jersey City, N. J., a corporation of New Jersey No Drawing. Application July 17, 1947,
Serial No. 761,731

12 Claims. (Cl. 260—410.6)

This invention relates to improved pure ether esters and to the production of ether esters, and more particularly to the reaction of castor oil with glycol monoethers to effect the alcoholysis of the castor oil, thereby forming the ricinoleic acid esters of glycol monoethers. Such purified ether esters and their acylated derivatives have great utility as plasticizers for natural and synthetic rubber and resinous materials.

Investigations have been made heretofore on alcoholysis reactions of the general type described herein, for example, as reviewed in an article in "Oil & Soap" 21, 145–148 (1944). The investigations reviewed in that article led the writers to the conclusion that such alcoholysis reactions are incomplete. It is also suggested in the article that an advantageous method for preparing the esters of the present invention involves the reaction of the methyl ester of a fatty acid with an alkylene glycol monoether at elevated temperatures such as 200° C. in the presence of catalysts such as litharge, lead naphthenate, lead soaps, and various alkaline salts.

In direct contrast to the findings and predictions of these prior art investigations, the inventor has discovered a process for the formation of ricinoleic acid esters of glycol monoethers, in which the reactions can and do go to completion, both in the laboratory and on a commercial scale. As an example of the completeness of the alcoholysis reactions of this invention, the ricinoleic acid ester of 2-methoxyethanol produced thereby has a saponification value of 158–160, the theoretical value being 158.2.

Other attempts in the prior art to effect substantial completion of the reactions described herein have involved additional preliminary reactions, elevated temperatures, and have been attended by the formation of undesirable gels or solids. For example, the intermediate products obtained by the process described in Carruthers U. S. Patent 2,310,395 are similar to the final products of the present invention. The patent referred to states that the use of alkali metal hydroxides as catalysts in a process of the type described in the present invention gives detrimental results, in that the reaction is quite slow and yields unidentified products which are gels or solids. The process of that patent involves the use of an inert diluent and when using sodium hydroxide as catalyst, the reaction is carried out at the elevated temperature of 80° C. For the reasons stated, the patentee's preferred catalysts are the glycol alkali metal monoethers corresponding to the glycol ether being esterified, which requires a preliminary reaction for the formation of those catalysts.

In contrast to the teaching of the patent above referred to, the present invention performs the reaction at ordinary temperatures, eliminates the necessity for the preliminary formation of an alcoholate from a glycol ether, and avoids the production of undesirable gels. The purity of the final ricinoleic acid esters according to the present invention is considerably greater than heretofore shown to be possible, in fact the degree of esterification of the esters prepared in accordance with the process of this invention is at least about 98% complete. The importance of this factor is especially emphasized by the greatly improved quality of the acylated derivatives of the ricinoleic acid esters prepared by the process of this invention when acylation reactions are performed thereon.

The purified esters of this invention and their acylated derivatives are particularly effective as plasticizers for natural rubber, synthetic rubber and resinous materials. The reaction of the process goes to substantial completion and enables the production of the desired esters to be accomplished more economically than hitherto believed possible by previously known processes. The esters of the present invention have minimal free fatty acid content.

Other objects and advantages of the invention will be apparent from the following description.

According to the process of this invention, ricinoleic acid esters of glycol monoethers are prepared by the interaction of castor oil with a glycol monoether in the presence of an alkali metal hydroxide. It is desirable that the castor oil used in the process of this invention be substantially neutral, and, in any case, that it have a free fatty acid content of not more than about 0.5% by weight. This condition can be attained by known methods. When the oil used has a higher acid value, a larger than normal amount of alkaline catalyst must be used in order that the acid be neutralized. Even when this is done, the esterification reaction is slow, resulting in a product having a high acid value and, in extreme cases, the reaction mixture tends to gel and thereby becomes difficult to process.

A wide variety of glycol monoethers may be utilized in carrying out the process of this invention, particularly alkylene and polyalkylene glycol monoalkyl ethers and monoaryl ethers. Typical examples of such monoethers are 2-methoxy ethanol, 2-ethoxy ethanol, 2-butoxy ethanol, 2-phenoxy ethanol, 2-benzyloxy ethanol, the monomethyl ether of diethylene glycol, and the monobutyl ether of tetraethylene glycol.

The molar ratio of the glycol monoether to the castor oil is rather critical, and should be in the range from about 7.0 to 1 to about 12 to 1. The best results are obtained when the molar ratio is between about 8.5 to 1 and about 10 to 1. When the reactants are present in these preferred ratios, the reaction proceeds at an optimum rate to completion.

The carrying out of the process of this invention is simplified by the fact that the reaction goes best at normal atmospheric temperatures, that is, temperatures in the range from about 20° to about 35° C. The preferred operating range is from about 25° to about 30° C. At temperatures lower than those indicated, the reaction proceeds so slowly as to be uneconomical. Higher temperatures than those indicated cause loss of catalyst due to saponification, with deleterious amounts of soap being formed.

The preferred alkaline materials for use as catalysts are the alkali metal hydroxides, such as sodium hydroxide and potassium hydroxide. The amount of alkaline catalyst required to effect the desired reactions is preferably from about 0.01 to about 1.0% by weight, based on the amount of castor oil used. The dry catalyst may be dissolved in the heated glycol monoether, but color develops in the latter when this is done. It is, therefore, preferable to introduce the catalyst into the reaction zone in the form of a concentrated aqueous solution, for example, a 50% solution.

The castor oil and glycol monoether charged to the reactor should be substantially anhydrous. The presence of water in the reaction zone results in higher percentages of free fatty acids in the product; for most purposes, it is desirable that the finished ester have a minimum free fatty acid content. The presence of water also slows the reaction, and, when the amount of water present exceeds about 6% by weight of the glycol monoether, the reaction is stopped.

The time required for the reaction between the glycol monoether and castor oil varies, depending upon the exact conditions used, from about 30 to about 90 minutes. The physical constants of the pure ester products of this invention can be determined, and set up as standards for determination of whether a particular reaction has gone to completion.

When the reaction is complete, the reaction mixture may be worked up in any desired manner. Thus, the excess glycol monoether may be separated from the final reaction mixture by vacuum distillation either before or after the neutralization of the catalyst with a mineral acid. The catalyst must be neutralized at some stage of the processing or the portion of the final reaction mixture containing the desired ester product may be washed countercurrently in an apparatus such as that of Colbeth U. S. Patent 2,249,746. The point at which the neutralization is effected depends somewhat on the material from which the reaction vessel or stillpot, from which the excess glycol monoether is volatilized, is constructed; for example, when the material is a copper alloy the catalyst must be neutralized before heat is applied; while when the vessel or pot is made, for example, from stainless steel, the catalyst need not be neutralized before the reaction mixture is heated. Neutralization before heating to volatilize and remove excess glycol monoether yields a finished ester with a lower free fatty acid content than if the heating is carried out without prior neutralization. In the latter case, the free fatty acid content can be lowered by washing the mixture, which has been freed from excess glycol monoether, in an apparatus such as that of the Colbeth patent referred to. This effects removal of soaps prior to the final neutralizing wash with acidified water.

The excess glycol monoether need not be separated from the reaction mixture by distillation. In any event, the final reaction product is water-washed to separate the glycerine formed in the reaction, the catalyst, and, when the distillation step is omitted, the excess glycol monoether from the desired ester product. This washing can be carried out in a batch fashion or continuously, as in a packed column. After the washing, the purified ester is dried, preferably under vacuum.

The following examples, in which the parts are expressed by weight, illustrate the invention, but it is to be understood that the invention is not limited to these examples.

*Example 1.*—In a reaction carried out at 20°–25° C., 2-methoxyethyl ricinoleate was prepared in two hours using equal weights of castor oil (having a free fatty acid content of 0.5%) and 2-methoxyethanol, and 0.5% of sodium hydroxide, based on the weight of castor oil used. The material charged to the reactor was substantially anhydrous. The dry catalyst was added to the reactor with the methoxy ethanol, being dissolved in the latter by warming. The color of the finished ester was somewhat affected by this procedure, as the methoxy ethanol developed a yellow color on being warmed with the catalyst. At the end of the two hour reaction period, the reaction mixture was washed free of excess methoxy ethanol, of glycerine formed in the reaction, of catalyst, and of any soap formed, by a batch-washing with water. The separated ester was dried under vacuum, and had a refractive index of 1.4631 and an A viscosity (Gardner-Holdt).

*Example 2.*—The same ester was prepared, again using 0.5% of sodium hydroxide, based on the weight of castor oil used, dissolved in heated 2-methoxy ethanol. In this case, the reaction was run at 25°–30° C. for one hour, using 233 parts by weight of castor oil (having free fatty acid content of 0.4%) and 143 parts of 2-methoxy ethanol. The final reaction mixture was worked up as in Example 1, yielding a good product having a refractive index of 1.4643.

*Example 3.*—This reaction was carried out as in Example 2, except that 200 parts by weight of castor oil were used with 147 parts by weight of 2-methoxy ethanol. The 2-methoxy ethyl ricinoleate prepared in this way had a refractive index of 1.4641.

*Example 4.*—300 parts by weight of substantially neutral castor oil were reacted with 220 parts by weight of 2-methoxy ethanol in the presence of 3 parts of a 50% aqueous solution of sodium hydroxide for 2 hours at 25°–30° C. At the end of this time, the catalyst was neutralized with dilute phosphoric acid; the excess methoxy ethanol was distilled from the reaction mixture under vacuum; the distillation residue was water-washed in an apparatus similar to that of Colbeth U. S. Patent 2,249,746; and the separated ester was dried under vacuum. The 2-methoxy ethyl ricinoleate prepared had the following constants: refractive index: 1.4648; specific gravity (15° C.): 0.954; viscosity (Gardner-Holdt): A; saponification value: 158.8.

*Example 5.*—The ricinoleic acid ester of the mono methyl ether of diethylene glycol was prepared by dissolving 1 part by weight of dry sodium hydroxide in 309 parts of the mono-methyl ether of diethylene glycol; to this were added 200 parts of substantially neutral castor oil. The reaction was allowed to proceed for one hour at 25°–30° C. The final reaction mixture was worked up as in Example 4. The ester product had the following constants: refractive index: 1.4628; saponification value: 147.3; viscosity (Gardner-Holdt): A.

*Example 6.*—The following were charged to a reactor: 300 parts by weight of castor oil (having a free fatty acid content of 0.25%); 380 parts of 2-butoxy ethanol; 1.3 parts of a 65% aqueous solution of potassium hydroxide. The reaction was allowed to proceed for 90 minutes at a temperature of 20°–25° C. The final reaction mixture was worked up as in Example 4. The 2-butoxy ethyl ricinoleate had a good color, and a free fatty acid content of less than 0.1%. This ester, as well as those prepared in the other examples, is a highly useful plasticizer for synthetic rubbers and resinous materials.

*Example 7.*—The following materials were charged to a reactor: 300 parts by weight of substantially neutral castor oil; 490 parts of 2-phenoxy ethanol; 1.6 parts of a 65% aqueous solution of sodium hydroxide. This mixture was agitated for 30 minutes at a temperature of 30° C. The product was worked up as in Example 4, the 2-phenoxy ethyl ricinoleate obtained having a good color and a free fatty acid content of less than 0.1%.

*Example 8.*—The following materials were charged to a reaction vessel: 300 parts by weight of substantially neutral castor oil; 390 parts of 2 benzyloxy ethanol; 2.4 parts of a 50% aqueous solution of sodium hydroxide. This mixture was agitated for 75 minutes at a temperature of 25° C. The final reaction mixture was worked up as in Example 4. The 2-benzyloxy ethyl ricinoleate obtained had a good color, and a free fatty acid content of about 0.1%.

*Example 9.*—The following materials were charged to a reaction vessel: 300 parts by weight of substantially neutral castor oil; 310 parts of the mono-ethyl ether of diethylene glycol; 2.7 parts of a 50% aqueous solution of sodium hydroxide. This mixture was agitated for 90 minutes at a temperature of 25° C. The reaction mixture was then worked up as in Example 4. The ricinoleic acid ester of the mono-ethyl ether of diethylene glycol obtained in this manner had a good color, and a free fatty acid content of less than 0.1%.

*Example 10.*—In a plant run, the charge to the reactor was as follows: 480 parts by weight of castor oil (having a free fatty acid content of 0.25%); 360 parts by weight of 2-methoxy ethanol; 3.35 parts by weight of a 50% aqueous solution of sodium hydroxide. This mixture was allowed to react for 90 minutes at a temperature of 25°–30° C. At the end of this time, the catalyst was neutralized by the addition of 3.05 parts by weight of phosphoric acid. Following this, the excess methoxy ethanol was distilled off under vacuum. The distillation residue was washed and dried as in Example 4. Batches of 2-methoxy ricinoleate prepared in this way had the following constants: refractive index: 1.4635–1.4650; saponification value: 158.0–160.0; viscosity (Gardner-Holdt): A—A–1.

The following examples illustrate the beneficial properties conferred on synthetic rubber and resin compositions by the incorporation therein of a ricinoleic acid ester of a glycol monoether or of an acetylated derivative of such an ester. Such acetylated and other acylated derivatives can be prepared readily and in quite pure form from any of the purified esters produced by the process of this invention. The non-acylated esters are treated, by known procedures, with such acylating agents as acetic anhydride, butyric acid, oleyl chloride, benzoyl chloride and the like.

In the plasticization of rubber and synthetic rubbers, and of cellulose derivatives, polyvinyl acetals and related resins, there is little to choose between the acylated and non-acylated derivatives; but, in the case of vinyl halide resin compounding, the use of the acylated derivatives is mandatory, since acylation renders the esters of this invention compatible with such resins.

*Example 11.*—2-methoxyethyl recinoleate in GR-S rubber. GR-S rubber (butadiene-styrene copolymer of 76.5% butadiene and 23.5% styrene) was compounded in a typical tread stock formulation and vulcanized at 292° F. to optimum cure. The formulation was as follows:

| | Parts by weight |
|---|---|
| GR-S | 100 |
| Zinc oxide | 5 |
| Carbon black | 50 |
| Accelerator (2-mercapto-benzothiazole) | 1.5 |
| Sulfur | 2.0 |
| Plasticizer | 20 |

Such a stock was plasticized both with 2-methoxyethyl ricinoleate and with Bardol (product a Barrett Div., Allied Chemical & Dye Corp.), the latter being a widely used coal-tar derivative which is generally accepted as being a satisfactory plasticizer for GR-S. Data illustrating the differences in physical properties between these two vulcanizates are as follows:

Bardol

| | Unaged | Aged 2 days | Aged 7 days |
|---|---|---|---|
| Modulus @ 300 % | 675 | | |
| Tensile, p. s. i | 1,550 | 1,975 | 1,750 |
| Elongation, per cent | 565 | 285 | 155 |
| Set, Per Cent | 20 | 10 | 5 |
| Shore Hardness | 60 | 80 | 85 |
| Per Cent Volatile @ 100° C | | 2.1 | 3.3 |

2-methoxyethyl ricinoleate

| | Unaged | Aged 2 days | Aged 7 days |
|---|---|---|---|
| Modulus @ 300 % | 750 | 1,725 | |
| Tensile, p. s. i | 2,150 | 1,900 | 1,625 |
| Elongation, per cent | 600 | 315 | 240 |
| Set, Per Cent | 15 | 10 | 5 |
| Shore Hardness | 50 | 70 | 75 |
| Per Cent Volatile @ 100° C | | 2.1 | 2.1 |

It may be seen from these data that 2-methoxyethyl ricinoleate is a superior plasticizer to Bardol for GR-S rubber. The softening action of the ricinoleate is initially greater than that of the Bardol, and the ricinoleate composition retains this quality in a higher degree upon being subjected to oven-aging. The quality of the recinoleate composition is particularly shown by its ability to maintain a high elongation value after such accelerated aging and to show ony moderate increase in Shore hardness.

*Example 12.*—2-methoxyethyl ricinoleate in Hycar OR-15. As in Example 11, a tread stock type of formulation was used and, in this case, the effectiveness of 2-methoxyethyl ricinoleate as a plasticizer was compared with the effectiveness of tributoxy ethyl phosphate, a well known plasticizer for butadiene-acrylonitrile copolymers. The formulation used was as follows:

| | Parts by weight |
|---|---|
| Hycar OR-15 [1] | 100 |
| Zinc oxide | 5 |
| Carbon black | 50 |
| Stearic acid | 0.5 |
| Accelerator (2,2'-benzothiazyl disulfide) | 1.5 |
| Sulfur | 1.5 |
| Plasticizer | 20 |

[1] Hycar OR-15 is a rubbery butadiene-acrylonitrile copolymer of about 85% butadiene-1,3, and about 15% acrylonitrile.

This formulation was cured at 307° F. for a sufficient period of time to develop optimum cure. As in Example 11, the resulting vulcanizates were tested unaged and after being subjected to oven-aging for 2 days and 7 days at 100° C.

*Tributoxyethyl phosphate*

| | Un-aged | Aged 2 days | Aged 7 days |
|---|---|---|---|
| Modulus @ 300% | 1,575 | | |
| Tensile, p. s. i. | 2,075 | 1,675 | 2,225 |
| Elongation, per cent | 380 | 210 | 170 |
| Set, per cent | 10 | 8 | 5 |
| Shore Hardness | 65 | 75 | 80 |
| Per cent Volatile @ 100° | | 4.3 | 6.5 |

*2-methoxyethyl ricinoleate*

| | Un-aged | Aged 2 days | Aged 7 days |
|---|---|---|---|
| Modulus @ 300% | 850 | 1,750 | |
| Tensile, p. s. i. | 2,700 | 3,050 | 1,725 |
| Elongation, per cent | 620 | 445 | 200 |
| Set, per cent | 25 | 15 | 5 |
| Shore Hardness | 60 | 70 | 75 |
| Per cent Volatile @ 100° C | | 2.5 | 3.6 |

These test results show the 2-methoxyethyl ricinoleate to tbe the more effective plasticizer in the unaged condition and this advantage is maintained and improved after the vulcanizates have been subjected to oven-aging. The value of the 2-methoxyethyl ricinoleate is shown particularly in the excellent elongation values imparted thereby and the relatively low volatility of the stock thus compounded when subjected to oven-aging.

*Example 13.*—2-methoxyethyl acetyl ricinoleate in VYNW. In vinyl compounding, 2-methoxyethyl acetyl ricinoleate is compared with di-octyl phthalate, which is generally accepted as being the most satisfactory plasticizer for vinyl resins presently available. The data given below show the effects of using 30 parts by weight of plasticizer with 70 parts of resin, when the resin is VYNW (copolymer of about 93–95% vinyl chloride and about 5–7% vinyl acetate), and the plasticizers compared are 2-methoxyethyl acetyl ricinoleate and di-octyl phthalate (DOP). These two compositions were uniformly fluxed down on a chrome-plated plastics compounding mill and sheets from the mill were press-polished and tested. Tests were made after oven-aging for 5 days at 100° C., and also after light aging for 100 hours at 45° C.

*Di-octyl phthalate*

| | Tensile | Per Cent Elongation | Per Cent Plasticizer Volatilized @ 100° C. | Low Temp. Flex, °C. Passed | Per Cent Plasticizer Extracted By Water |
|---|---|---|---|---|---|
| Original | 3,395 | 265 | | −90 | 0.20 |
| After oven-aging | 3,275 | 265 | 2.1 | | |
| After light-aging | 2,775 | 190 | | | |

*2-methoxyethyl acetyl ricinoleate*

| | Tensile | Per Cent Elongation | Per Cent Plasticizer Volatilized @ 100° C. | Low Temp. Flex, °C. Passed | Per Cent Plasticizer Extracted By Water |
|---|---|---|---|---|---|
| Original | 3,380 | 280 | | −90 | 4.4 |
| After oven-aging | 3,195 | 280 | 2.2 | | |
| After light-aging | 2,830 | 225 | | | |

These results show 2-methoxyethyl acetyl ricinoleate to be equivalent or superior to DOP in all properties, both original and after various form of accelerated aging, except for water extraction.

*Example 14.*—2-methoxyethyl acetyl ricinoleate in VYNS. In this case, 2-methoxyethyl acetyl ricinoleate was compared with DOP as a plasticizer for VYNS (copolymer of about 88.5–90.5% of vinyl chloride and about 9.5–11.5% vinyl acetate). Again, 30 parts by weight of plasticizer were used with 70 parts of the resin, and the compositions were fluxed down on a plastics mill. The flexible films thus resulting were formed into smooth films in a press and tested in the unaged condition, also after being heated-aged for 4 hours at 125° C. and again after being light-aged at 45° C. for 100 hours. The data are tabulated below in three consecutive sections representing these changes in the aged condition of the film: Unaged, Over-aged, Light-aged.

| Plasticizer | Modulus @ 100° C. | Tensile | Per Cent Elongation | Shore Hardness | Per Cent Plasticizer Volatilized | Low Temp. Flex. Failure at ° C. |
|---|---|---|---|---|---|---|
| UNAGED | | | | | | |
| Ricinoleate | 1,265 | 2,445 | 270 | 85 | | −50 |
| DOP | 1,580 | 2,685 | 250 | 95 | | −50 |
| OVEN-AGED | | | | | | |
| Ricinoleate | 965 | 1,930 | 245 | 65 | 1.32 | −40 |
| DOP | 1,210 | 1,990 | 235 | 65 | 2.76 | −40 |
| LIGHT-AGED | | | | | | |
| Ricinoleate | 965 | 2,360 | 300 | 85 | .168 | |
| DOP | 1,175 | 1,875 | 215 | 88 | .226 | |

These results show 2-methoxyethyl acetyl ricinoleate to be equivalent to DOP as a plasticizer for VYNS.

In view of the many changes and modifications that may be made without departing from the principles underlying the invention, reference should be made to the appended claims for an understanding of the scope of the protection afforded the invention.

What is claimed is:

1. The process for the production of the ricinoleic acid ester of a glycol monoether selected from the group consisting of alkylene and polyalkylene glycol monoalkyl ethers and monoaryl ethers, which comprises reacting said monoether with castor oil containing not more than 0.5% of free fatty acids, said reactants being utilized in a molar ratio of from 7 to 1 up to 13 to 1 respectively, under substantially anhydrous conditions at a temperature in the range from 20° to 35° C. and in the presence of from 0.01% to 1.0% of alkali metal hydroxide, based on the weight of castor oil used.

2. The process of claim 1, in which said monoether is an alkylene glycol monoalkyl ether.

3. The process of claim 1, in which said monoether is 2-methoxy ethanol.

4. The process of claim 1, in which said monoether is an alkylene glycol monoaryl ether.

5. The process of claim 1, in which said monoether is 2-benzyloxy ethanol.

6. The process of claim 1, in which said monoether is a polyalkylene glycol monoalkyl ether.

7. The process of claim 1, in which said monoether is the monomethyl ether of diethylene glycol.

8. The process of claim 1, in which said molar ratio is in the range from 8.5 to 1 up to 10 to 1.

9. The process of claim 1, in which the reaction temperature is in the range from 25° to 30° C.

10. The process of claim 1, in which said alkali metal hydroxide is sodium hydroxide.

11. The process of claim 1, in which said alkali metal hydroxide is charged to the reactor in the form of a concentrated aqueous solution.

12. The process of claim 1, in which the unneutralized reaction product is freed from glycerine, monoether, alkali metal hydroxide, and any soap present by water-washing, and the resulting purified ricinoleic acid ester is dried.

MALCOLM KENT SMITH.

REFERENCES CITED

The following references are of record in the file of this patent:

UNITED STATES PATENTS

| Number | Name | Date |
|---|---|---|
| 1,739,315 | Kessler et al. | Dec. 10, 1929 |
| 2,285,420 | Doolittle | June 9, 1942 |
| 2,310,395 | Carruthers | Feb. 9, 1943 |
| 2,386,182 | Balcar | Oct. 9, 1945 |

OTHER REFERENCES

"Ether esters, plasticizers for vinyl coating": Tuttle et al., Modern Plastics, December 1946 (pages 163–166).